United States Patent
Ravagni et al.

[11] Patent Number: 5,920,023
[45] Date of Patent: Jul. 6, 1999

[54] STRINGED INSTRUMENT FINGER POSITIONING GUIDE AND METHOD FOR TEACHING STUDENTS TO READ MUSIC

[76] Inventors: Steven F. Ravagni; Patricia M. Ravagni, both of 1204 W. Lake Sammamish Pkwy. S.E., Bellevue, Wash. 98008

[21] Appl. No.: 08/762,835

[22] Filed: Dec. 10, 1996

[51] Int. Cl.⁶ .................................................. G09B 15/00
[52] U.S. Cl. .................... 84/485 R; 84/470 R; 84/477 R
[58] Field of Search ............................. 84/470 R, 477 R, 84/485 R

[56] References Cited

U.S. PATENT DOCUMENTS

| | | |
|---|---|---|
| 357,168 | 2/1887 | Barnwell . |
| 494,698 | 4/1893 | Zorger . |
| 656,917 | 8/1900 | Wicht . |
| 826,379 | 7/1906 | Sprotte . |
| 852,407 | 4/1907 | Galbraith . |
| 939,486 | 11/1909 | Fish . |
| 1,699,380 | 1/1929 | Stewart . |
| 1,719,604 | 7/1929 | Finney . |
| 1,991,864 | 2/1935 | Nopola et al. . |
| 3,153,970 | 10/1964 | Mulchi . |
| 3,218,904 | 11/1965 | Hartman . |
| 3,403,590 | 10/1968 | Quinton . |
| 3,785,240 | 1/1974 | Hill . |
| 3,820,434 | 6/1974 | Roberts . |
| 3,978,756 | 9/1976 | Feldman . |
| 4,291,606 | 9/1981 | Lepage . |
| 4,559,861 | 12/1985 | Patty et al. . |
| 4,712,464 | 12/1987 | Nance . |
| 4,791,848 | 12/1988 | Blum, Jr. . |
| 5,594,191 | 1/1997 | Epstein et al. . |

FOREIGN PATENT DOCUMENTS

| | | |
|---|---|---|
| 676514 | of 1929 | France . |
| 1325933 | of 1963 | France . |

OTHER PUBLICATIONS

Advertisement by Cribnote Co., appearing in *Guitar World*, Feb., 1997, p. 203.

*Primary Examiner*—William M. Shoop, Jr.
*Assistant Examiner*—Shih-yung Hsieh

[57] ABSTRACT

The present invention is directed to a device for teaching students of stringed instruments note locations and proper finger placement on the fingerboard of the instrument. The device may be adapted for use with either a fretted or non-fretted instrument. The device comprises a sheet of autogenously adhesive plastic, such as cling vinyl, on which is printed a series of markers indicating note locations, scales or chords. If the device is to be applied to a fretted instrument, the device further has fret openings cut therein, adapted to engage the frets when applied to the instrument. The device is applied to the instrument by inserting it between the strings and the fingerboard, wrapping it around the neck of the instrument and adhering it onto itself along the back of the neck of the instrument.

7 Claims, 5 Drawing Sheets

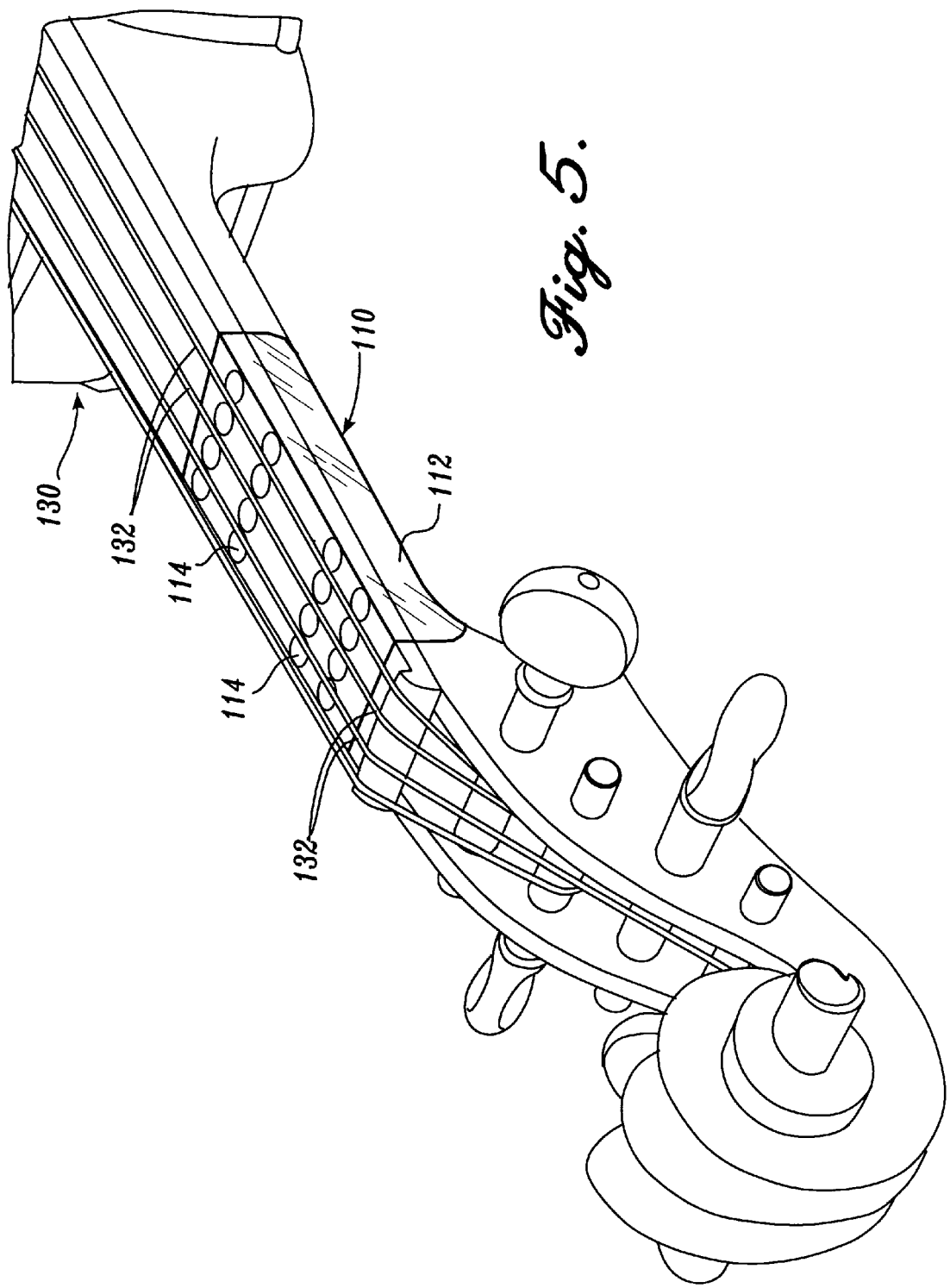

STRINGED INSTRUMENT FINGER POSITIONING GUIDE AND METHOD FOR TEACHING STUDENTS TO READ MUSIC

FIELD OF THE INVENTION

The present invention relates to devices and methods for teaching a student to play a fretted or non-fretted stringed instrument. More particularly, the present invention is directed to devices for teaching a student note or chord names, and proper finger placement to play individual notes, chords or scales, on a fretted or non-fretted stringed instrument, and to an improved method for teaching a student of a stringed instrument to read music.

BACKGROUND OF THE INVENTION

Both fretted and non-fretted stringed instruments, including but not limited to guitars, ukuleles, violins, violas, and cellos, comprise the following parts: a sound box or board having a sound hole or "f" holes, a neck and fingerboard, a nut, a head and tuning pegs, strings, and a bridge. Instruments such as violins, violas and cellos also have a tailpiece which anchors the strings. On a stringed instrument, the strings extend from the tailpiece, or bridge if no tailpiece is present, to the tuning pegs, and are raised above the fingerboard by the bridge and nut. The fingerboard of a fretted instrument, such as a guitar or banjo, has raised, longitudinally transverse bars called "frets" positioned at spaced intervals along the length of the fingerboard. The fingerboard of a non-fretted instrument, such as a violin, viola or cello, has no frets, and is flat and smooth.

In play, the tone of a particular string of a fretted or non-fretted stringed instrument is changed by changing the length of the string. When a string is depressed against the fingerboard between two frets, the depressed string contacts the frets on either side of the point of depression to change the harmonic vibration of the string, and thus change the tone of the string. The length of the string is changed on non-fretted instruments by finger pressure along the length of the string, placing the string in contact with the fingerboard. On either a fretted or non-fretted stringed instrument, different notes are sounded by strumming, glancing, picking, or bowing the strings with one hand, or a bow or like instrument, while the fingers of the other hand depress the strings against the fingerboard. Strumming, glancing, picking, or bowing a single string will create a single note. Strumming or bowing several strings simultaneously or in rapid succession so that several notes are sounded in unison, creates a chord. Generally, to play a chord, several strings must be depressed at various positions along the neck. An "open string" (a string which has not been depressed) may also form part of a chord. Chords may be played on both fretted and non-fretted stringed instruments.

When learning to play a stringed instrument, a student must learn at what point along the length of the fingerboard the string must be depressed to play a particular note, and a student must learn to read music so that he or she recognizes the written note. Particularly in the case of fretted instruments, a student must also learn which notes comprise a particular chord, learn the names of the chords, and, preferably, learn to read the written notes comprising the chords. Thus, a beginning student must learn a significant amount of information, including the parts of the instrument, note names, note locations on the fingerboard, and the construction of written music, and must expend a significant amount of time and effort before the student can obtain satisfaction from his or her efforts.

To encourage the beginning stringed instrument student and accelerate the process of learning to play notes, chords and scales, and learning how to read music, a variety of teaching devices have been employed. However, many of these devices have significant shortcomings, making them ineffective or unappealing to use. For example, U.S. Pat. No. 4,712,464 to Nance discloses a finger positioning guide including a flat surface which is positioned between the neck and strings of a fretted stringed instrument to present a set of uniformly colored dots beneath the strings at predetermined distances along the neck to enable a student of that instrument to play chords. The flat surface is positioned in relation to the neck and the strings by a plurality of slots adapted for engaging the frets and nut of the fingerboard. An edge limiting device is appended to the surface of the guide to further position the guide on the fingerboard. The edge limiting device may form a clamp which secures the guide to the fingerboard. The guide is made of a resilient material which allows the clamp to be retained on the neck of the instrument by spring action, thereby holding the guide securely in place on the neck. The finger positioning guide described in the patent to Nance has limited utility primarily because it is bulky and interferes with the students hand position and agility. Additionally, the Nance guide could negatively affect tonal quality.

U.S. Pat. No. 852,407 to Galbraith describes a finger positioning guide made from a sheet of pliable material, such as linen, muslin or aluminum, which extends along the length of the fingerboard, having fret openings cut throughout the material and being secured to the sides of the fingerboard and at the top of the neck of the instrument by pins in the neck and body of the instrument, in this way retaining a chart on the fingerboard of the stringed instrument. The disadvantages of this finger positioning guide include the difficulty of retaining a material such as aluminum or muslin on the fingerboard of an instrument so that the markers indicating note locations are maintained in a constant position. Furthermore, application of the guide to the fingerboard is likely to result in damage to the fingerboard in view of the nails or tacks used to retain the guide. Additionally, play and intonation are likely to be affected by stretching and movement of the guide when applied to the fingerboard and during play.

U.S. Pat. No. 3,978,756 to Feldman discloses a teaching method which utilizes optionally transparent adhesive labels which may be releasably secured to the face of a fingerboard between the frets of a stringed instrument. The labels have colored markers instructing a student where to place his or her fingers to play certain notes. The indicator labels are attached to the face of the fingerboard, between frets, by an adhesive, such as glue. The adhesive finger positioning guide disclosed in the Feldman patent is to be used in association with a mirror, and a clamp which attaches sheet music printed in reverse which can then be viewed in the mirror. The method and guide described in the Feldman patent has several disadvantages. Primarily, the guide and method are cumbersome and difficult to use. Additionally, the guide is not reusable, is likely to leave glue residue on the fingerboard, and is likely to detach from the fingerboard accidentally with use.

U.S. Pat. No. 3,153,970 to Mulchi describes a device for teaching stringed instrument players proper finger placement comprising a series of cards which may be alternately placed in position on the fingerboard of a guitar, and which are then withdrawn after the fingers are placed in the proper positions. At the very least, this method and guide is cumbersome and does not develop agility and the ability to change finger positions quickly.

U.S. Pat. No. 939,486 to Fish and U.S. Pat. No. 1,719,604 to Finney describe modifications to the fingerboards of non-fretted instruments which comprise protrusions extending from the surface of the fingerboards so that a student may feel the proper place to depress a string to play a particular note. These methods and devices for learning proper finger placement and note locations on a fingerboard have the disadvantage of being permanent and damaging modifications to the fingerboard of the instrument, which could significantly interfere with play, such as shifting positions, as the student advances in skill. Furthermore, these methods and devices do not teach note names or correlate the finger positions to written music.

U.S. Pat. No. 1,699,380 to Stewart describes a method for teaching the principle chords of a musical instrument by applying a plurality of contrasting characters to the front surface of a fingerboard indicating chords. The characters may be printed on the fingerboard, printed on a gummed label which may then be glued to the surface of the fingerboard, or countersunk in the fingerboard. Again, this method for teaching chords has the disadvantage of requiring permanent changes to the fingerboard, or applying adhesives to the fingerboard, which may damage the finish, are not reusable, and may leave a sticky residue that interferes with play, among other things.

Yet another method for teaching proper finger location on a fingerboard of a non-fretted instrument is the application of strips of tape longitudinally across the fingerboard, marking the location of certain notes on each string, from which location certain other notes can be determined. This method is disadvantageous because, as the instrument is played, the tape is warmed and tends to slide. A student using this method and relying too heavily on the position of the tape strips to locate proper notes, may never develop good intonation since he or she is very likely become accustomed to notes that are out of tune. Furthermore, the glue leaves the fingerboard sticky, interferes with play and can potentially cause damage to the finish of the fingerboard.

In summary, a variety of methods and devices have been developed for indicating note or chord locations on the fingerboard of a stringed instrument, such as a guitar or a violin. The devices include a variety of markers, including colored dots coding notes, numbers coding notes, actual note names, and neutral dots marking the proper finger positions to play a particular note or chord. A variety of means for attaching these markers to fingerboards have also been used, including glue, printing the markers on the fingerboard, inlaying the markers in the fingerboard, and by attaching fabric, plastic or paper to the fingerboard by mechanical means such as pegs, or glue. These methods and devices have significant shortcomings, because they either require permanent changes to the instrument, are likely to result in damage to the instrument, are likely to move or slip during play so that the note locations are not constant, cannot be removed and reapplied at will, interfere with play, or do not teach note names, as necessary to advance to the next level of play.

Thus, there is a long felt need for a finger positioning guide which may be releasable secured to a fingerboard of an instrument without damaging the instrument or its finish, and which does not interfere with play of the instrument when applied to the instrument. What is further needed in the art is a finger positioning guide which teaches notes names and locations on the fingerboard of a stringed instrument which may be removably applied to the instrument and used only as needed, or transferred from one instrument to another.

SUMMARY OF THE INVENTION

The present invention is directed to a finger positioning guide that may be adapted for use with either fretted or non-fretted stringed instruments, including but not limited to guitars, violins, cellos, banjos and ukuleles, and which may be used to teach a student note locations on the fingerboard enabling a student to play individual notes, chords or scales. The finger positioning guide comprises a flat sheet of autogenously adhesive material having a top and a bottom, wherein the top of the guide corresponds to that end of the guide that is nearest to the nut of the instrument when the guide is applied to the instrument and the bottom of the guide corresponds to that end of the guide that is furthest from the nut when applied to the instrument. The guide further comprises one or more markers indicating, for example, individual notes or locations to place one's fingers to play chords or scales, printed thereon. As used herein, the phrases "autogenously adhesive" and "self adhering" refer to a material which is inherently adhesive so that it clings to itself without the aid of an adhesive such as glue. "Cling vinyl" refers to a poly vinyl chloride material that has these characteristics.

A preferred embodiment of the finger positioning guide of the present invention includes note names comprising part of the markers. The markers used to indicate notes may be coded to specifically identify scales or chords, as well as individual notes. If the finger positioning guide is to be applied to a fretted instrument, the guide further comprises openings corresponding to the locations of the frets on the fingerboard at spaced intervals along the length of the guide. If the finger positioning guide is to be applied to an instrument having a heel where the neck of the instrument is attached to the sound box, the end of the guide nearest the heel may also be adapted to accommodate the heel when the guide is applied to the fingerboard.

The finger positioning guide of the present invention is applied to the instrument by sliding it between the fingerboard and the strings of the instrument, aligning the top of the guide flush with the nut, and, if fretted, aligning the fret openings with the frets so that the fret openings engage the frets. The guide is then wrapped around the neck of the instrument to form a collar, and retained on the fingerboard by adhering to itself along the back of the neck of the instrument. The positioning guide of the present invention does not generally adhere to the instrument itself. Instead, is retained on the instrument by adhering to itself due to the nature of the plastic from which the guide is made. No glue or mechanical means are required to retain the positioning guide on the fingerboard. If the fingerboard of the instrument is constructed from plastic or fiberglass, it is possible the guide of the present invention will adhere lightly to the fingerboard. Generally, the less porous the material, the more likely the guide will adhere to it. The guide may be easily removed from the fingerboard when play is completed, and then reapplied when needed. Thus, the guide of the present invention is removably attached to the fingerboard and neck, and may be reused.

As noted, the guide is marked to indicate note locations on the fingerboard. Markers may be used to code individual notes, chords or scales, as desired. When the guide is applied to the instrument, these markers are aligned beneath the strings of the instrument. The note locations may be printed on the guide by colored dots having note names thereon, numbers thereon or any other appropriate means. The notes may be marked to identify individual scales or individual notes. For example, every note in the C major scale may be coded by a red dot, or every location of the note "C" on the fingerboard may be coded by a red dot. The guide may also be adapted to show proper finger placement on the fingerboard of the instrument to enable the student to play chords, rather than individual notes. It is understood, of course, that chords are comprised of individual notes; however, rather than learning individual notes, beginning guitar players are often taught chords without reference to sheet music.

The finger positioning guide of the present invention may be used with sheet music which includes note names, or on which the notes have been printed in colors corresponding to the colors used to identify the notes on the finger positioning guide, thereby accelerating the rate at which a student can learn to read music and correctly position his or her fingers on the fingerboard. The guide can also be printed so that different chords or scales are color coded, rather than color coding individual notes. The markers may be printed on the guide of the present invention to indicate anything desired, including notes, chords or scales. It is contemplated that the guide of the present invention may even be adapted to allow the application of removable designs or logos to the instrument.

Thus, it is an object of the present invention to provide a device for teaching students of stringed instruments proper note locations on the fingerboard of a stringed instrument.

It is a further object of the present invention to provide a device for teaching students note locations on the fingerboard of a stringed instrument wherein the device is removably attached to the fingerboard of the instrument.

It is a further object of the present invention to provide a device for teaching students of stringed instruments note locations on the fingerboard of the stringed instrument wherein the device requires no glue or mechanical means to attach the device to the stringed instrument.

It is yet another object of the present invention to provide a device for teaching students of stringed instruments note locations on the fingerboard of a stringed instrument wherein the device does not cause any damage to the instrument's fingerboard, neck, or finishes thereon.

It is yet another object of the present invention to provide a device for teaching students of stringed instruments note locations on a fingerboard wherein the device is securely adhered to the fingerboard so that it does not move during play.

It is also an object of the present invention to provide a device for teaching note locations on the fingerboard of a stringed instrument wherein the device is flush with the fingerboard and does not interfere with play of the instrument by closely silhouetting the shape of the neck of the instrument.

It is a further object of the present invention to provide a device for teaching students of stringed instruments to play chords.

It is yet another object of the present invention to provide a device for teaching students of stringed instruments to encourage the development of proper intonation.

These and other objects, features and advantages of the present invention will be better understood from the following detailed description, considered in connection with the accompanying drawings in which two embodiments of the invention are illustrated by way of example. It is to be understood, however, that the drawings are for purposes of illustration and description only, and are not intended as a definition of the limits of the invention.

BRIEF DESCRIPTION OF THE DRAWINGS

FIG. 5 is a three-dimensional view of the front of the neck of a non-fretted instrument, such as a violin, with the finger positioning guide of the present invention applied thereto.

DETAILED DESCRIPTION OF THE INVENTION

Figure 1:
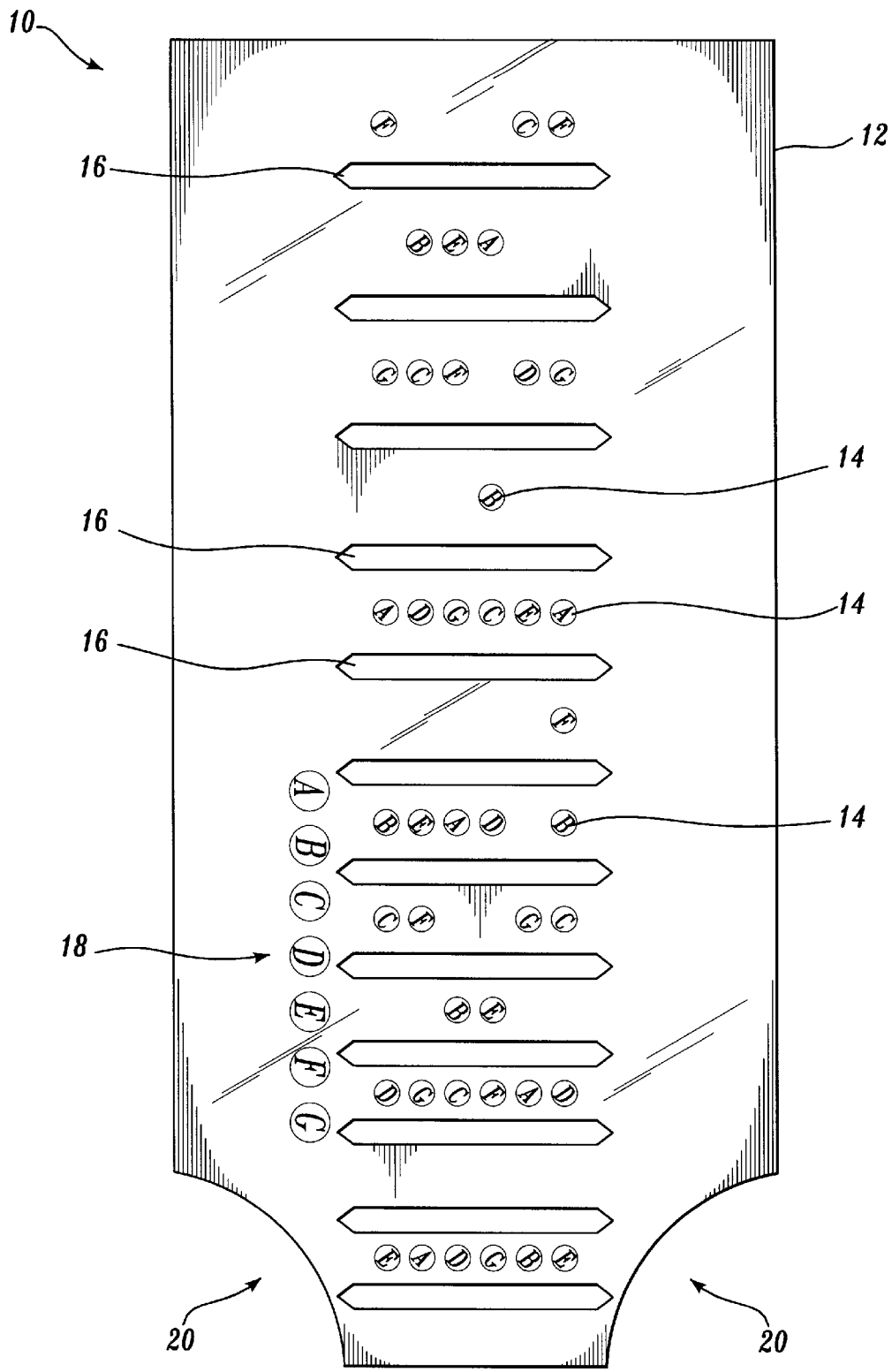
FIG. 1 is a two-dimensional front view of one embodiment of the finger positioning guide of the present invention suitable for use with a fretted stringed instrument, such as a guitar.

With reference to FIG. 1, the finger positioning guide 10 of the present invention comprises a sheet of self adhering or autogenously adhesive plastic 12, such as cling vinyl, having printed thereon markers 14 indicating, for example, note locations for a particular stringed instrument. The top of the guide 10 corresponds to that portion of the guide 10 nearest to the nut of the instrument when the guide is applied to the instrument, and the bottom of the guide 10 corresponds to that portion of the guide 10 nearest to the sound box of the instrument when the guide is applied to the instrument. The sheet of autogenously adhesive plastic 12 should be sufficiently wide to wrap around the fingerboard and neck of the instrument at the widest point of the length of the fingerboard and neck covered by the guide 10, and overlap, preferably by approximately ¼ to ⅜ of an inch, to form a collar around the neck of the instrument, as illustrated in FIG. 4. Additionally, the sheet of autogenously adhesive plastic 12 should at least be long enough, extending from the nut down the length of the fingerboard, to cover the length of the fingerboard most commonly used by beginning students. The finger positioning guide 10 may be adapted for use with either fretted (see FIGS. 1, 2 and 3) or non-fretted (see FIG. 5) instruments.

Figure 2:
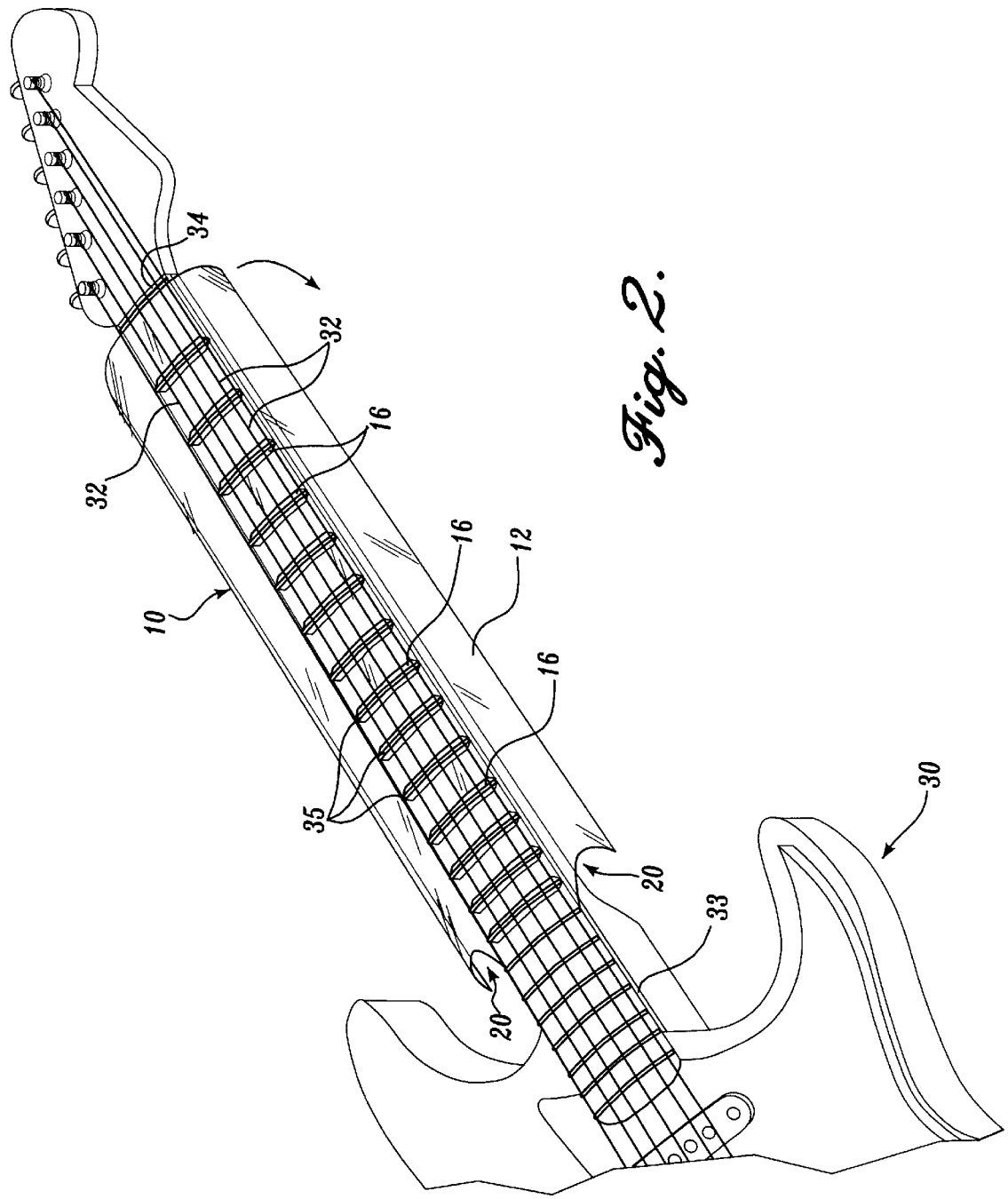
FIG. 2 is a three-dimensional view demonstrating application of one embodiment of the finger positioning guide of the present invention to the neck and fingerboard of an electric guitar.
Figure 3:
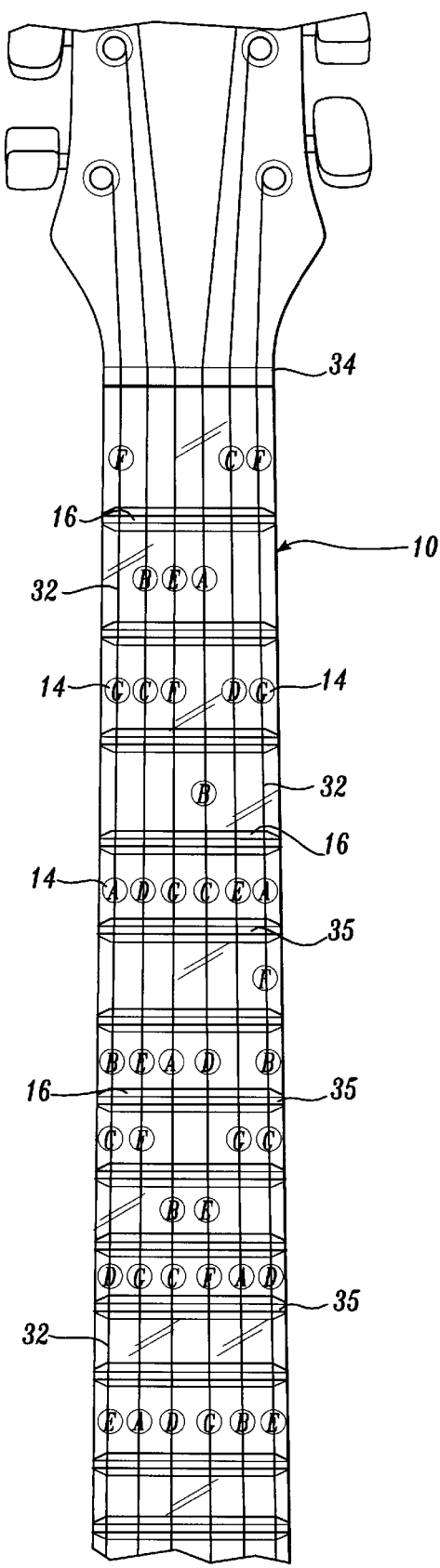
FIG. 3 is a two-dimensional view of the front of the neck and fingerboard of a guitar with one embodiment of the finger positioning guide of the present invention applied thereto.
Figure 4:
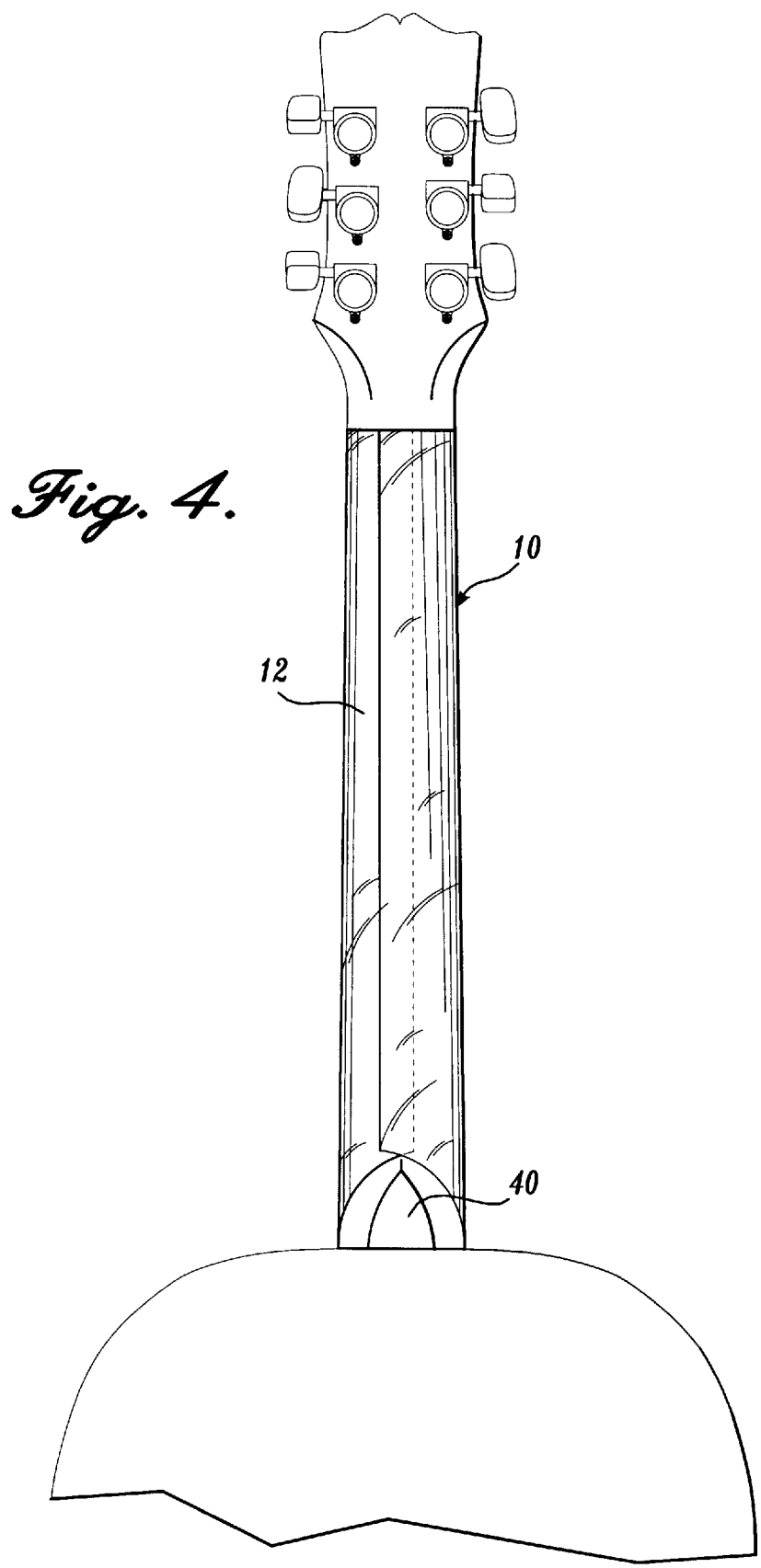
FIG. 4 is a three-dimensional view of the back of the neck of a guitar having one embodiment of the finger positioning guide of the present invention applied thereto.

FIGS. 1, 2 and 3 show an embodiment of the finger positioning guide 10 for use with fretted instruments. With reference to FIGS. 1, 2 and 3, the guide 10 has a series of fret openings 16, corresponding to the locations of the frets 35 on the fingerboard of the instrument and adapted to engage the frets 35 when the guide 10 is applied to the instrument, intermittently spaced along the length of the guide 10. Although the fret openings 16 may be formed to fit snugly around the frets 35, in a preferred embodiment of the present invention, the fret openings 16 are formed wider and longer than the frets 35 so that a single guide 10 may be used on a broader range of instruments having fingerboards of similar length. In a preferred embodiment of the guide 10 for use with fretted instruments, the ends of the fret openings 16 are elongated, having curved or angled ends, such that a single guide 10 may be applied to a fretted instrument of the same type and fingerboard length, but having a different neck width. In a preferred embodiment of the present invention, the fret openings 16 are sized to leave a space of approximately 3/16 of an inch around the circumference of each fret 35.

As demonstrated in FIG. 5, the finger positioning guide 110 of the present invention may be designed to be applied to a non-fretted instrument, including but not limited to a violin, viola or cello. The fret openings 16 shown in FIG. 1 are not required and should not be included as part of the guide 110 for a non-fretted instrument, as illustrated in FIG. 5. Instead, the guide 110 comprises a single solid sheet of autogenously adhesive plastic 112 cut to be applied to a specific type and size of non-fretted instrument 130.

As noted above and with reference to FIG. 1 as an example of a guide 10 for a fretted instrument, the guide 10 has a plurality of markers 14 printed thereon indicating the locations of specific notes on the fingerboard. In an alternate embodiment, the markers 14 printed on the guide indicate groups of notes required to play chords on a particular instrument. In yet another embodiment, the markers 14 printed on the guide 10 may be used to indicate groups of notes in a particular scale. In a preferred embodiment of the guide 10, each marker 14 comprises a colored dot corresponding to a specific note, and the note name. For example, the marker 14 for the note A may appear as a red dot and the letter "A" wherever the note A is located on the fingerboard. In a preferred embodiment of the present invention, the note A appears on red, B appears on orange, C appears on yellow, D appears on pink, E appears on blue, F appears on white, and G appears on green. A total of at least seven different colors are needed to represent the seven notes of the diatonic scale. The most important criteria in selecting the colors to identify the individual notes is that the colors be clearly visible and clearly distinguishable from one another. If the markers 14 are being used to identify chords or scales, all the notes in a particular chord or scale may be identified by the same colored marker 14. A legend 18 indicating the colors used to identify the marker 14 for each note may also be included.

In a preferred embodiment of the guide 10 for use with a fretted instrument such as a guitar, the note names comprising the markers 14, may be turned at a 45° angle (see FIG. 1) so that the note names appear straight to a student looking over the neck of the instrument. Likewise, in alternative embodiments, the note names may be printed at the angle that is most suitable for viewing by a student when playing a particular instrument.

In the case of an instrument such as a banjo, guitar or ukulele, in which chords rather than individual notes are frequently played, an alternative embodiment of the guide 10 comprises having chord notations printed thereon. For example, a chord may be marked by markers 14 of a specific color having a finger number on the marker 14 instead of a note name. By using a multitude of colors, a plurality of chords may be printed on a single guide.

With reference to FIG. 3, in one preferred embodiment of the present invention, the markers 14 are positioned on the guide 10 so that when the guide 10 is applied to the instrument and aligned with the nut 34 of the instrument, each marker 14 is positioned below the appropriate string 32 and is clearly visible thereunder. The markers 14 should be positioned in this way whether the guide is adapted for use with a fretted or non-fretted stringed instrument (see FIG. 5). It is to be understood that any method which enables clear viewing of the note locations on the fingerboard of the instrument may be used to mark the notes or chords on the guide. For example, the markers 14 may consist of note names only, colored dots only, or of combinations thereof. The type of marker 14 used depends on the goal of the finger positioning guide 10 and whether that goal is to teach note names, chords, scales, or simply enable a novice musician to play a few songs without having to learn the fundamentals of reading music. The art is replete with methods for marking notes on the fingerboard of a stringed instrument. Many of these methods may be adapted for use with the present invention.

The guide of the present invention is constructed from a elastomeric material, such as flexible plastic, which may be cast in sheet form and cut to fit the specific instrument of interest. Suitable plastics may include highly plasticized poly vinyl chloride, polyurethanes, morthanes, or other thermoplastic synthetic rubber compounds. In a preferred embodiment of the present invention, the guide 10 is constructed of an autogenously adhesive or self adhering plastic sheet 12, such as "cling vinyl". Cling vinyl is a highly plasticized polyvinyl chloride material. One presently preferred cling vinyl for constructing the guide 10 of the present invention is FLEXMARK CV-800-CTC-245 70 PW cling vinyl manufactured by Flexcon of Spencer, Mass. One thermoplastic synthetic rubber compound suitable for use in constructing the guide of the present invention is commercially available from the GLS Company under the trademark DYNAFLEX. Another plastic contemplated for use is a Morthane brand aliphatic thermoplastic polyurethane from Morton International. The materials employed and identified as aliphatic thermoplastic polyurethanes may be polyether based or polyester based, and the Morthane® line of polyether-based and polyester-based aliphatic thermoplastic polyurethanes are particularly suitable for the purposes of the present invention. These are obtained from Morton International, Inc., Seabrook, N.H., and include Morthane PE199-100, PE193-100, PE192-100, and PN3429-100, by way of illustration but not by way of limitation. These polymers are characterized by excellent resilience, good low temperature flexibility, superior color stability, and outstanding UV stability. Most importantly, the plastic selected must have surface adhesion characteristics such that they are capably of releasably adhering to themselves.

Preferably, the autogenously adhesive plastic sheet 12 comprising the guide 10 is approximately 0.8 mm thick. The thickness of the plastic used is significant because it must not interfere with the student's fingers or hand position when playing the instrument. It is important that the plastic be thick enough to avoid stretching and tearing when it is warmed during playing, but it must be thin enough to avoid creating an unnatural feeling in the hands of the student when applied to the instrument. The most important feature of the plastic used to construct the guide of the present invention is that it be autogenously adhesive, namely, that it be capable of sticking to itself without application of an adhesive.

For most guitars, the autogenously adhesive plastic sheet 12 comprising the guide 10 should be at least six (6) inches wide to encircle the neck of the instrument. The appropriate width of the guide 10 for other instruments can be determined by measuring the circumference of the fingerboard at several points along its length, and allowing for additional material so that the ends of the guide 10 will overlap, preferably ¼ to ⅜ of an inch, when the guide 10 is applied to the neck of the instrument.

The markers 14 may be applied to the device using any type of permanent ink. In a preferred embodiment of the present invention, Sericol™ inks are used, manufactured by Sericol of Kansas City, Mo. It is important that the inks be capable of permanently adhering to the plastic material so that they are not easily smeared or worn away with use.

For ease of manufacturing, the colored dots indicating the notes, scales or chords may be printed on the front of the device first, followed by the note name or proper finger number. When the guide is viewed from on top, the markers 14 are printed on the top of the guide. In an alternate embodiment, the note names may be printed in reverse on the back of the guide first, and the colored dotes then applied to the note names. Viewing the guide from on top, the markers 14 are visible through the guide, when the guide is constructed of transparent plastic. Printing the markers 14 on the back of the guide reduces wear of the markers 14, since the ink is on the back of the guide when it is applied to the instrument, and protected from contact with a musician's fingers, With reference to FIGS. 2 and 3, the finger positioning guide 10 of the present invention is applied to a stringed instrument 30 by inserting the guide 10 between the strings 32 and the fingerboard 33 so that the top of the device is flush with the nut 34 of the instrument 30 and the markers 14 are aligned beneath each string. If the guide 10 is being applied to a fretted instrument, the fret openings 16 are aligned with each fret 35 along the length of the instrument. With reference to FIG. 5, if the guide 110 is applied to a non-fretted instrument 130, the markers 114 are likewise aligned beneath each string 132, but no fret openings are necessary.

The finger positioning guide 10 of the present invention is retained on the fingerboard of the instrument by adhering to itself along the back of the neck of the instrument, as shown in FIG. 4. The guide 10 should be wider than the circumference of the neck and fingerboard at their widest points so that the guide 10 may be wrapped around the fingerboard and overlap itself along the length of the back of the neck. In this way, the finger positioning guide 10 is retained on the fingerboard. No mechanical means such as glue, clamps, nails, or tacks are needed to retain the guide securely in position on the fingerboard. To ensure better contact of the guide 10 with the fingerboard and neck, it is advisable to clean the fingerboard and neck with an acceptable instrument cleaning solution before application of the guide 10. Because wood instruments are sensitive to humidity, it is also not advisable to keep the guide on the neck of the instrument for extended periods of time.

Certain instruments such as guitars and violins have "heels" where the neck is attached to the sound box. FIG. 4 illustrates application of the guide 10 to the neck of an instrument with a heel 40. FIG. 1 demonstrates that when the guide 10 is to be applied to an instrument with a heel 40 (see FIG. 4), the bottom of the guide 10 should be cut away 20 to accommodate the heel 40 of the instrument when the guide 10 is wrapped around the neck of the instrument.

With respect to instruments such as violins and violas, the finger positioning guide 110 may be prepared for use in first position only, or in second, third and fourth position as well. If it is to be used in positions other than "first" it may be necessary to adapt the guide 110 to accommodate the heel of the instrument. Generally, by the time a student is playing in third or fourth position, the ear is sufficiently trained so that this type of teaching device is no longer necessary. Nevertheless, the guide 110 may be adapted to accommodate a heel if desired.

To remove the finger positioning guide from the instrument, the guide should be peeled apart where it overlaps, and simply slipped from between the strings and fingerboard. Since no glue or other mechanical means are used to attached the guide to the instrument, there is no need to clean the instrument after removable of the guide. The finger positioning guide of the present invention is reusable, and may also be transferred to different instruments of the same type and similar size.

The finger positioning guide of the present invention may be used with sheet music in which the notes have been printed to correspond to the markers on the finger positioning guide, thus enabling a student to identify the notes on the staff (or chord names) with the markers on the guide, and accelerate learning.

To manufacture the finger positioning guide of the present invention for use with fretted instruments, namely guitars, the lengths of the fingerboards of 14 representative beginner guitars were measured to $1/100$ of an inch, from the nuts to each fret, fret numbers 1–13. The necks of the guitars were also measured to determine their circumferences. Circumference measurements were taken at the nut and at the thirteenth fret. String spacing on each guitar was also measured at the nut and at the thirteenth fret. Using the largest of each of the measurements, a fingerboard was drawn to be used as a template for designing the finger positioning guide of the present invention.

A model finger positioning guide was then drawn based on the model fingerboard created from the measurements of the actual guitars. In a preferred embodiment of the guide of the present invention for use with a guitar, the top edge of the guide is designed to be aligned with the nut and the lower edge is designed to aligned with the thirteenth fret. In a preferred embodiment of the present invention, the lower edge of the guide extends to within $3/16$ of an inch of the thirteenth fret. Each fret opening has a perimeter of approximately $3/16$ inch around each fret. Twelve fret openings are actually cut in the guide. The top of the thirteenth fret aligns with the bottom edge of the guide. The guide is designed to be wide enough to overlap itself along the back of the instrument neck. A wider guide can accommodate a greater number of neck widths.

The shape of the guide was drawn on a computer indicating the locations of the fret openings and markers. The guide was then printed using standard industry techniques. Color separations were created and acetate film positives were made for each color in its proper place. Black and "die-line" plates were also created. The total number of plates created was nine—the note colors, black and the die-line plate. Press plates were then used to print the markers onto the FLEXMARK cling vinyl. Printing was accomplished using standard industry techniques. Nine plates were printed in all. After printing, fret openings were cut into the guide and the outside dimensions of the device were trimmed. Standard industry techniques for wing-less style diecutting were used.

While the preferred embodiments of the invention have been illustrated and described, it will be appreciated that various changes can be made therein without departing from the spirit and scope of the invention as defined in the appended claims.

The embodiments of the invention in which an exclusive property or privilege is claimed are defined as follows:

1. A finger positioning guide for indication finger placement locations on the fingerboard of a stringed instrument comprising:
   a. a stringed instrument having an elongated neck with a circumference and a fingerboard, and;
   b. a sheet of autogenously adhesive plastic having a width greater than the circumference of said elongated neck and adapted to surround said circumference and;
   c. said sheet having at least one finger positioning marker and;
   d. wherein said sheet and marker is positioned over the said fingerboard and wrapped around said neck and substantially conforming to said neck and said sheet overlapping itself whereby said sheet adheres to itself, thereby being removably attached to said stringed instrument, with said marker indicating the position to place a finger on said fingerboard.

2. The guide of claim 1 further comprising a plurality of finger positioning markers.

3. The finger positioning markers of claim 2 further comprising markers in groups wherein the members of the group together indicate the finger positions for sounding chords on said instrument.

4. The finger positioning markers of claim 2 mark the finger positions for sounding groups of notes comprising musical scales.

5. The finger positioning markers of claim 2 further comprising markers having annotation for indicating the note corresponding to the finger position, and;

said annotation is at least one means selected from the group comprising color, letter, number, and;

said letter and number annotation is rotated to read in the normal attitude for letters and numbers when said instrument is played in the usual diagonal orientation across the instrument users body, thereby improving the readability of said number and letters.

6. A finger positioning guide for indicating finger placement locations on a finger board of a fretted stringed instrument comprising:

a. a stringed instrument having an elongated neck and a fingerboard with frets and;

b. a plurality of finger positioning markers further comprising markers in groups wherein the members of the group together can indicate the finger positions for sounding chords on said instrument.

c. the finger positioning markers further comprising markers in groups wherein the members of the group together can indicate the finger positions for sounding scales on said instrument.

d. a sheet of plastic having openings adapted to receive frets therethrough and;

e. wherein said sheet is positioned over the said fingerboard with said frets extending through said openings and wrapped around said neck and substantially conforming to said neck and said sheet overlapping itself whereby said sheet adheres to itself, thereby being removably attached to said stringed instrument, with said marker indicating the position to place a finger on said finger board and;

f. wherein the operative alignment of the finger positioning guide on the instrument is established by the frets extending through the finger positioning guide.

7. The finger positioning markers of claim 6 further comprising markers having annotation for indicating the note corresponding to the finger position, and;

said annotation is at least one means selected from the group comprising color, letter, number, and;

said letter and number annotation is rotated to read in the normal attitude for letters and numbers when said instrument is played in the usual diagonal orientation across the instrument users body, thereby improving the readability of said number and letters.

* * * * *

UNITED STATES PATENT AND TRADEMARK OFFICE
Certificate

Patent No. 5,920,023

Patented: July 6, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Steven F. Ravagni; Patricia M. Ravagni; and Nicholas D. Ravagni, all from Issaquah, Washington.

Signed and Sealed this Sixteenth Day of July 2002.

ROBERT NAPPI
*Supervisory Patent Examiner*
Art Unit 2837